United States Patent
Hartkamp et al.

[11] 3,908,696
[45] Sept. 30, 1975

[54] METERING OF TRACE AMOUNTS OF FLUIDS FOR PRODUCING LOW CONCENTRATIONS THEREOF IN CARRIER FLUIDS

[75] Inventors: Heinrich Hartkamp, Heiligenhaus; Gerhard Nitz, Mulheim, Ruhr, both of Germany

[73] Assignee: Landesanstalt fur Immissions und Bodennutzungsschutz des Landes Nordrhein-Westfalen, Essen, Germany

[22] Filed: Nov. 11, 1974

[21] Appl. No.: 522,351

[30] Foreign Application Priority Data
Nov. 9, 1973 Germany.................. 7340140[U]

[52] U.S. Cl................................. 137/604; 138/44
[51] Int. Cl.²......................................... F16K 19/00
[58] Field of Search............... 137/604, 117; 138/44

[56] References Cited
UNITED STATES PATENTS
3,760,831  9/1973  Colvin.............................. 137/117

*Primary Examiner*—Robert G. Nilson
*Attorney, Agent, or Firm*—Ralf H. Siegemund

[57] ABSTRACT

Three releasibly, physically, but not fluid conductively interconnected tubes provide for the immediate environment of a capillary duct. The entrance of the capillary is in a first one of the tubes which receives fluid to be metered, and constant driving pressure is maintained in that first tube through an external pressure regulator and air auxiliary pressure source. The second one of the tubes receives carrier fluid to mix with metered fluid emerging from the exit of the capillary duct. The third tube interconnects the other two and holds the capillary duct.

9 Claims, 2 Drawing Figures

METERING OF TRACE AMOUNTS OF FLUIDS FOR PRODUCING LOW CONCENTRATIONS THEREOF IN CARRIER FLUIDS

BACKGROUND OF THE INVENTION

The present invention relates to a metering of trace amounts of fluid for obtaining highly diluted test samples thereof in a carrier fluid, for purposes of trace analysis. More particularly the invention relates to metering of fluids by means of a capillary duct for injection into the carrier medium for thorough mixing therewith.

A metering device of this type permits rather accurate metering of a fluid if the parameters determining capillary flow are kept constant; concentration will remain constant if the carrier flow is also kept constant. The resulting fluid mixture can well serve as a primary standard, because fluid flow at throughput through a capillary can be predetermined quite accurately because capillary flow can be calculated on the basis of well known laws of physics without any significant simplifying assumption.

One of the parameters determining throughput and rate of flow through a duct is pressure. Constant throughput may, therefore, require pressure regulation to maintain a constant value. On the other hand, very small concentrations of a particular component in a carrier fluid is the primary goal and one can see generally that metering may well be amenable to interference which must be eliminated. Aside therefrom, metering should still be carried out in a rather simple manner and without requiring complicated manual operation.

DESCRIPTION OF THE INVENTION

It is an object of the present invention to provide for a new and improved metering device operating on the basis of capillary flow.

In accordance with the preferred embodiment of the invention it is suggested to provide two tubes whose interiors are fluid conductively interconnected through a capillary duct only. The tube with the capillary duct entrance receives the fluid to be metered and is connected to have regulated pressure as driving pressure for fluid through the capillary duct. The other tube has a lateral entrance for carrier fluid and a discharge outlet for the low concentration output mixture. The capillary duct extends into that other tube whereby the capillary exit is located downstream of the lateral entrance for the carrier fluid.

The capillary is preferably held in a third tube which provides for releasible, physical interconnection of the two other tubes. Constant driving pressure is maintained in the one tube through connection to a source for constant pressure, preferably a gas pressure source, whereby preferably a continuous fluid flow away from the one tube is maintained under prevention of backflow.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
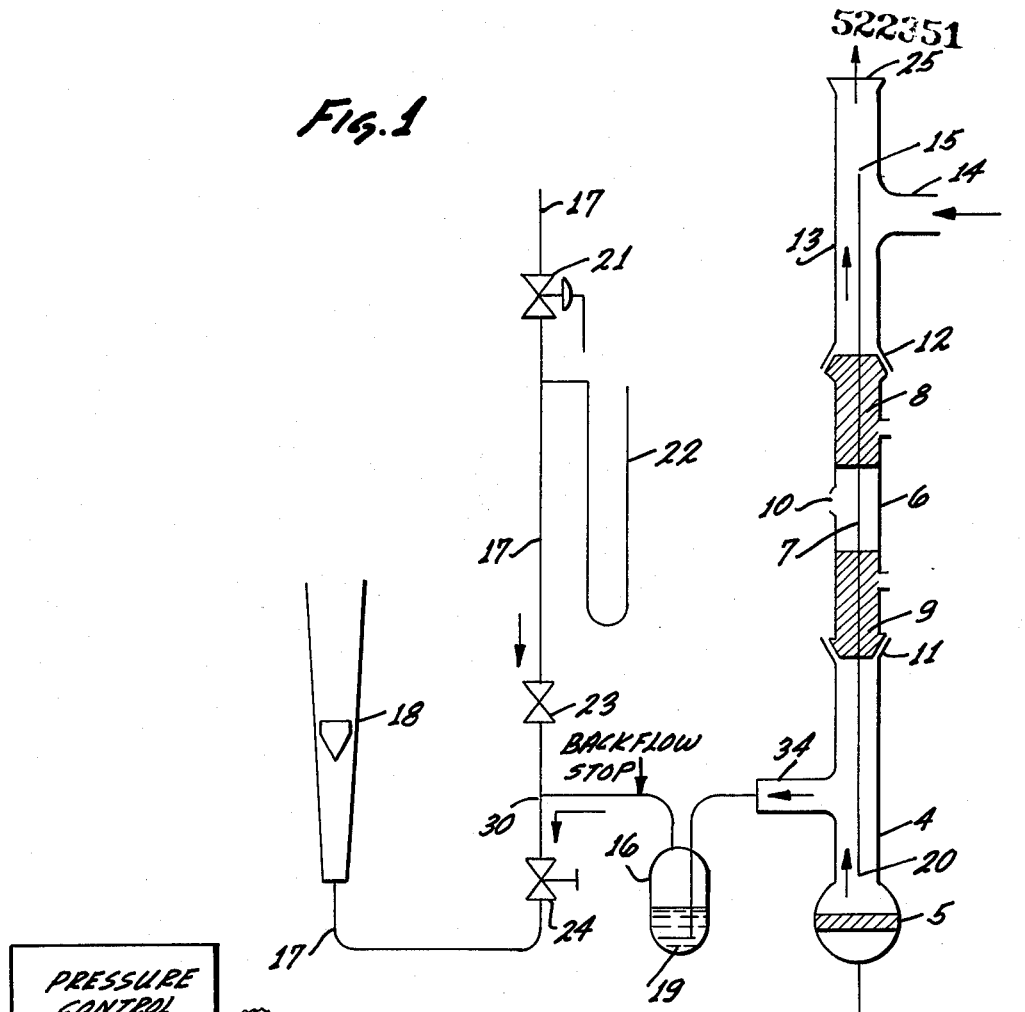
FIG. 1 is a somewhat schematic representation of a new and improved metering device and system for gas, constructed in accordance with the preferred embodiment of the invention.

Proceeding now to the detailed description of the drawings, gas to be metered is taken from a steel bottle 1 by means of a needle valve 2 and a two-way valve 3, to flow into a tube 4. A filter 5 is disposed ahead of or in the entrance of tube 4 to remove any impurities from this sample gas.

Tube 4 is the first one of three series connected tubes, 6 and 13 are the two others. These three tubes do not directly communicate with each other, but they are physically interconnected by means of two ground-in type joints 11 and 12. These joints provide for good sealing, but are easily disconnectible.

Central tube 6 has two plug type elements 8 and 9 for sealing both ends of tube 6 (thereby sealing tube 4 from tube 13) while holding and embedding a capillary duct 7 which, in effect, provides for capillary flow communication between tubes 4 and 13, as the exclusive fluid connection between these tubes.

Tube 4 has a lateral discharge exit 34 leading to a bubble indicator 16. The connection from outlet 34 is submerged in liquid 19 in chamber 16 while gas is discharged from the top, leading to equipment for pressure control to be described shortly.

Tube 6 has a lateral port 10 for connecting the interior of this tube with the outer atmosphere. This connection actually prevents diffusion of air into the metering circuit.

Tube 13 has a lateral charge inlet 14 through which flows the carrier gas at a constant rate. Pressure regulation and/or rate of flow metering of the carrier fluid is not part of the invention, and known techniques are applicable here. An axial end opening 25 discharges carrier gas, but now mixed with the metered test or sample gas. The latter enters capillary 7 at its entrance opening 20 inside of tube 4, flows through the capillary duct and discharges at exit opening 15 of the capillary, downstream from the carrier gas inlet of tube 13.

Test gas and sample gas mix well in the (in the drawing) upper portion of tube 13, and it is important for thorough mixing that the capillary 7 and particularly its exit opening 15 projects beyond (downstream of) the lateral entrance 14 for the carrier gas. The mixture discharges at 25 and flows through an additional conduit to an analyzer. The connection and analyzer is known and does not require elaboration.

Now I turn to the description of the pressure regulation for sample gas. As stated, the lateral duct 34 provides for outflow of gas that has entered tube 4 but did not continue into capillary 7. Generally speaking, excess sample gas can be discharged into the outer atmosphere through bubble chamber 16 and a float type flow meter 18.

The rate of outflow here is indirectly controlled through an auxiliary gas (line 17), e.g. pressurized air is fed to the system to control the discharge of sample gas from tube 4, by sucking such gas out of bubble chamber 16 and into junction 30 wherein the auxiliary gas is combined with drawn off sample gas.

The liquid 19 in chamber 16 prevents backflow of auxiliary gas into tube 4 (and into the capillary). The ascent of bubbles in that liquid 19 indicates proper operation of the metering device, as a particular pressure gradient is to be maintained between the interior of tube 4 and junction 30; or, to state it differently by regulating the pressure at point 30, a particular pressure is maintained in tube 4 by drawing off any excess sample gas.

It may be advisable to provide for an additional valve such as an automatic, pressure controlled valve or check valve which blocks any connection between tube 4 and conduit 17 for any flow from the latter to the former. This would occur, if the auxiliary gas pressure exceeds the pressure under which sample gas passes into tube 4.

The auxiliary gas flow and effective pressure is determined by a pressure regulator 21; pressurized air is applied from a suitable source and regulator 21 provides for constant feed pressure into the continuation of duct or conduit 17. This way, particular pressure is established and maintained at junction 30 which in turn maintains a particular pressure in tube 4 and here particularly at the entrance opening 20 to the capillary.

The throughput of sample fluid is determined by the pressure differential between inlet and outlet of the capillary duct, and outlet pressure may, for example, be atmospheric pressure.

The junction 30 can be isolated from the remainder of duct 17 through a valve 23 at the inlet side for auxiliary gas, and a throttling valve 24 is provided downstream from the junction 30. These valves together with the pressure gauge 22 are provided for fine trimming of the central pressure which will be effective in tube 4.

Valves 23 and 3 are of primary importance for starting and stopping of the metering device and process.

By way of example, capillary 7 may have length from 4 to 8 inches with a capillary radius of 2 to 50 micrometers. Throughput can be varied over a wide range, e.g. from 1 microliter per hour to 200 milliliters per hour if the pressure (excess of atmospheric pressure) at the capillary entrance opening 20 is varied e.g. from 100 micrometers water column to 10 bar. Pressure changes (e.g., in form of a step function change) result in a new equilibrium within a few seconds.

The purpose of providing the ground-in surface type joints 11 and 12 is to facilitate exchange of the capillary duct. Central tube 6 with stoppers 8 and 9 is the carrier for the capillary and can be readily exchanged as a whole after disconnection from the two tubes 4 and 13.

Of course, a more permanent type of connection may provide for a better sealing, particularly because it has occurred that outside air may enter the metering device, through very tiny leakage paths in the joints or in the cemented bonds between tube 6 and plugs or stoppers 8, 9. However, this problem was surprisingly overcome by the lateral port 10 in tube 6. This port actually prevented diffusion of outside air into the metered flow of sample gas, and that in turn permits utilization of the easy-to-disconnect type joints 11, 12.

Figure 2:
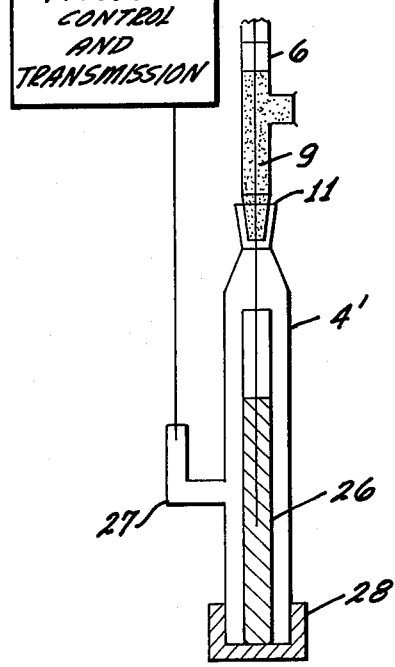
FIG. 2 illustrates a modification of part of the system shown in FIG. 1 for application to liquids.

FIG. 1 illustrates a particular apparatus for metering sample gas traces, FIG. 2 illustrates a modification for using the same principles for metering a sample liquid.

Reference numeral 26 refers to a storage tube 26 for the liquid to be metered at a trace rate. This storage tube 26 is disposed inside of a tube 4' whose function is otherwise analogous to tube 4, namely, to provide for a pressure controlled environment for the capillary 7, held otherwise in tube 6 as before. A cap screw 28 closes tube 4' but permits easy access to its interior for replacement of tubular container 26 when exhausted by a new and filled one. Tube 13 (not shown here) and particularly the mixing with carrier gas is the same as before.

Capillary 7 in this instance dips into the liquid in tube 26 and the tube 4' has a discharge outlet 27 through which is applied a particular pressure, as the determining entrance pressure at the submerged capillary entrance. Sample liquid is, therefore, driven into and through the capillary duct and evaporates at the exit in tube 13 for mixing with the carrier gas. It was found, that gas-vapor mixtures of very low vapor concentration can be produced with a very accurately constant vapor concentration in the flow of carrier gas.

The Hagen-Poiseaille law permits very accurate determination of the fluid flow, gas or liquid, through a capillary on the basis of the predetermined and known dimensions of the capillary duct and for a particular viscosity of the fluid which is also a known material parameter. Only the pressure difference is the remaining variable parameter and is adjusted in the manner described, and the flow rate of fluid through the capillary can be accurately predetermined accordingly.

It has to be considered however, that for small pressure differentials across the length of the capillary, surface tension of the liquid enters now into the consideration. Particularly, for zero pressure difference, surface tension maintains a capillary flow through the duct and continuous evaporation at the duct's exit. However, for larger pressure differences surface tension ceases to be of any influence and one will, therefore, operate in the pressure range of better predictability. The auxiliary gas pressure is selected sufficiently high accordingly. It should be noted, however, that surface tension at low operating pressure is merely an added complication and not an aspect rendering the device useless. One must merely consider that zero trace concentration cannot be metered but that surface tension produces a minimum rate of flow for zero driving pressure. However, selecting a small enough capillary permits maintaining very small flow rates of metered fluid. In practice, such excessively low concentrations are not needed. Moreover, the carrier gas rate is, of course, another variable as far as concentration is concerned.

The device as described, particularly with reference to FIG. 2, permits metering of homogenic liquids as well as of mixtures of liquids. Moreover, a carrier liquid in lieu of a carrier gas can be used in either case.

In the case of metering a liquid, connection from 27 to auxiliary pressure source junction may not need a pressure responsive valve, but a bubble chamber for observing proper operation is still advisable. Moreover, the vapor pressure of the sample liquid may not be sufficient to drive the liquid into the capillary. Hence, driving pressure will have to be applied to connection 27 but under sealed conditions including e.g., a liquid seal and movable diaphragm or piston to transmit controlled pressure (point 30 in FIG. 1) to the interior of tube 4, but without any flow of auxiliary gas into the tube 4.

The liquids or gases metered may well be chemically agressive as all parts with which such fluid comes into contact can readily be made of material that will not be attacked (e.g. corroded) by such fluid. For most cases glass is well suited as material for tubes and capillary duct.

The invention is not limited to the embodiments described above but all changes and modifications thereof not constituting departures from the spirit and scope of the invention are not intended to be included.

We claim:

1. Metering device for obtaining low concentration of a particular fluid in a carrier fluid, comprising:
   a first tube connected to receive the particular fluid;
   a second tube having a lateral inlet for connection to receive the carrier fluid, further having an outlet, carrier fluid flowing from the lateral inlet to the outlet;
   a capillary duct having entrance and exit openings and extending from the interior of the first tube to the interior of the second tube, the entrance opening being located in the first tube, the exit opening being located in the second tube and downstream from the inlet so that the capillary duct discharges into the second tube downstream from the inlet thereof, the capillary duct providing the only fluid connection between the first and second tubes; and
   means including a source for constant and regulated auxiliary pressure and pressure - conductively connected to the interior of the first tube for obtaining a particular and regulated fluid pressure at the entrance opening of the capillary duct.

2. Metering device as in claim 1, wherein a third tube is provided for positioning and holding the capillary duct and physically connecting the first tube to the second tube without fluid-conductively interconnecting them except through the interior of the capillary duct.

3. Metering device as in claim 2, the third tube having two sealed stoppers respectively at its ends for holding the capillary duct, the third tube having a lateral opening between the stoppers.

4. Metering device as in claim 2, wherein the third tube is connected to the first and second tubes through ground joints.

5. Metering device as in claim 1, there being means to prevent flow from the pressure source into the first tube.

6. Metering device as in claim 1, the means including a bubble chamber containing liquid to maintain a pressure differential and outflow from the first tube.

7. Metering device as in claim 1, the first tube being connected to a source of gas as the particular fluid, there being a filter interposed.

8. Metering device as in claim 1, and including a tubular container in the first tube containing a liquid as the particular fluid, the capillary entrance opening dipping into the liquid in the container.

9. Metering device as in claim 1, the tubes and the capillary duct being made of glass.

* * * * *